United States Patent [19]

Boville

[11] Patent Number: 5,228,816

[45] Date of Patent: Jul. 20, 1993

[54] PLASTIC CLIP

[75] Inventor: Daniel Boville, Paris, France

[73] Assignee: A. Raymond & Cie., Grenoble, France

[21] Appl. No.: 914,511

[22] Filed: Jul. 17, 1992

[30] Foreign Application Priority Data

Aug. 7, 1991 [DE] Fed. Rep. of Germany ....... 9109791

[51] Int. Cl.$^5$ .............................................. F16B 21/00
[52] U.S. Cl. .................................. 411/340; 411/508; 24/297
[58] Field of Search ................ 44/508, 340, 500, 502, 44/907, 908, 15; 24/297, 453, 607; 411/512

[56] References Cited

U.S. PATENT DOCUMENTS

| 3,130,822 | 4/1964 | Meyer | 24/297 |
|---|---|---|---|
| 3,246,376 | 4/1966 | Landwer | 24/297 |
| 4,112,815 | 9/1978 | Tanaka | 411/512 |
| 4,262,394 | 4/1981 | Wright | 411/349 X |
| 4,377,358 | 3/1983 | Wollar | 411/15 |
| 4,438,552 | 3/1984 | Omata | 24/297 X |

FOREIGN PATENT DOCUMENTS

| 566840 | 12/1958 | Canada | 24/297 |
| 411927 | 11/1921 | France | 411/340 |

Primary Examiner—Rodney M. Lindsey
Attorney, Agent, or Firm—Finnegan, Henderson, Farabow, Garrett & Dunner

[57] ABSTRACT

A plastic clip for the blind fastening of soft-elastic rubber mats on carrier plates. The clip consists of two spreading fingers (1, 1') which can be pushed through a fastening hole (10) in a mat (5), and of two stem halves (2, 2'), joined at right angles to the fingers, and which, in the state in which the clip is supplied, project outwards and are pivotally joined to one another by a flexible web (4). To mount the clip, the spreading fingers lying adjacent each other are first pushed into the hole in the mat and are then bent apart by pivoting the two stem halves together. The two stem halves now forming one complete stem are then pressed into a hole (11) in a carrier plate (6) and anchored in the hole by the protrusion (7, 7') on the stems.

5 Claims, 2 Drawing Sheets

PLASTIC CLIP

BACKGROUND OF THE INVENTION

This invention relates to a plastic clip for the blind fastening of soft-elastic flat bodies such as rubber mats on carrier plates.

A clip of this type is known from U.S. Pat. No. 4,377,358. It consists of two spreading fingers which can be pushed through a fastening hole in the flat body and carrier plate and forced apart on the rear side of the latter. The clip has a divided stem, two halves of which are each provided with a flange-like protrusion and are initially connected in a straight line with respect to the spreading fingers After introduction into aligned fastening hole, the spreading fingers are bent over immediately behind rear most edge of the holes and pressed outwards until the spreading fingers lie flat against the rear side of the carrier plate.

In order to be able to force the spreading fingers apart from the mounting side, the free ends of the spreading fingers are each provided with a cooperating flange half and are joined at the other end to two rods which are disposed close to one another and side by side between the spreading fingers and, at a point just behind the flanges, are brought together to form a common rod. In this state, which is the state in which the clip is supplied, the rod projects beyond the flanges. After the spreading fingers have been inserted into the superimposed holes in the two plates which are to be joined together and the flange halves are brought to bear against the front side of the two plates, the rod is pressed into the clip. The ends of the spreading fingers joined to the rods are thus caused to yield, each to one side, and are firmly pressed against the plate from the rear in such a way that the two plates are firmly clamped between the flange and the spreading fingers.

This plastic clip is considered very complex because of the rod required to spread out the fingers. There is also the danger of the rod being pressed in too far, which will tend to pull the spreading fingers away from the underside of the plate. The pressure applied against the plate may thus be reduced or even completely eliminated, so that the desired clamping effect will not be achieved.

With this prior art as starting point, the problem underlying the invention is that of providing a plastic clip for blind fastening which is of simpler and therefore less expensive construction and which ensures simple handling and a reliable clamping action.

SUMMARY OF THE INVENTION

According to the invention, this problem is solved by providing a clip, in which, in the state in which it is supplied, the stem halves and the spreading fingers project outwards approximately at right angles to each to form two L-shaped parts that are pivotally joined to one another by a flexible web at the mutually opposite bases of the two L's.

More specifically, the present invention provides a plastic clip for securing a soft-elastic flat body to a carrier plate comprising a pair of L-shaped parts, each part comprising a spreading finger having an inner end and an outer end, and a stem half having an inner end and an outer end, the inner end of each stem half being rigidly joined approximately right angles to the inner end of a spreading finger to form said pair of L-shaped parts and a flexible web interconnecting said two parts together from the outside of the base of the L of each part, the two parts being pivotable with respect to one another between a first position where the two spreading fingers lie adjacent each other and can be pushed through a fastening hole in the flat body and a second position where, after the fingers are pushed through said hole in the flat body, the two stem halves lie adjacent each other to form a complete stem and the fingers are forced apart and bear against the front side of the body, wherein said complete stem can now be pushed through a fastening hole in the plate and resilient, compressible locking protrusions on said stems spaced from the inside of the base of the L of each part that pass through and then bear against the rear edge of said hole in the plate.

For the purpose of fastening a soft-elastic flat body, such as for example a rubber mat, on a carrier plate, the plastic clip of the invention is thus first introduced by its spreading fingers, which lie side by side, into the fastening hole in the mat until the stem halves, now projecting outward at right angles, lie against the front edge of the hole. The spreading fingers are then pressed further into the hole and at the same time the stem halves projecting towards the sides are now brought together to form a complete stem, while the spreading fingers pivot apart and are engaged behind the edge of the hole and against the rubber mat on its front side. The assembled stem halves are then pressed into the hole in the carrier plate until the protrusions on the stem halves pass through the hole and bear against the rear edge of the hole in the carrier plate.

In a preferred embodiment of the invention, oppositely directed interengageable catch hooks are additionally provided on the free ends of the stems, these hooks interlock after the stem ends have been brought together, thus effecting additional clamping action by the spreading fingers In order further to improve the clamping action, thin separating tongues may, in addition, project, approximately at right angles from the stem halves and at a distance from the protrusions. After the stem halves have been introduced into the hole in the carrier plate, these tongues are clamped between the two plates which are to be joined together.

BRIEF DESCRIPTION OF THE DRAWINGS

A preferred exemplary embodiment of the invention will be described more fully below with reference to the drawings, in which.

DETAILED DESCRIPTION OF THE INVENTION

Figure 1:
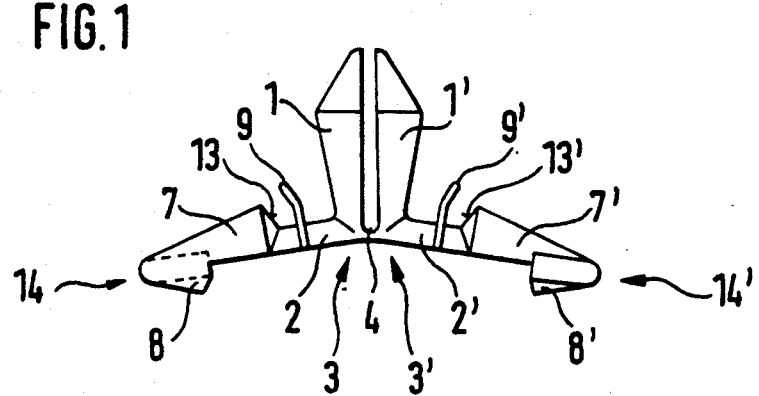
FIG. 1 is a side view of the plastic clip of the invention in the state in which it is supplied.
Figure 2:
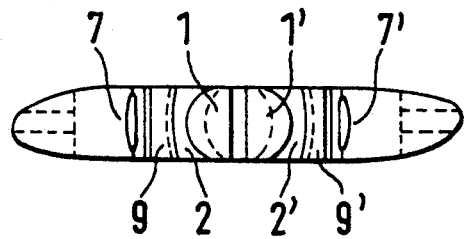
FIG. 2 is a plan view of the plastic clip shown in FIG. 1.
Figure 3:
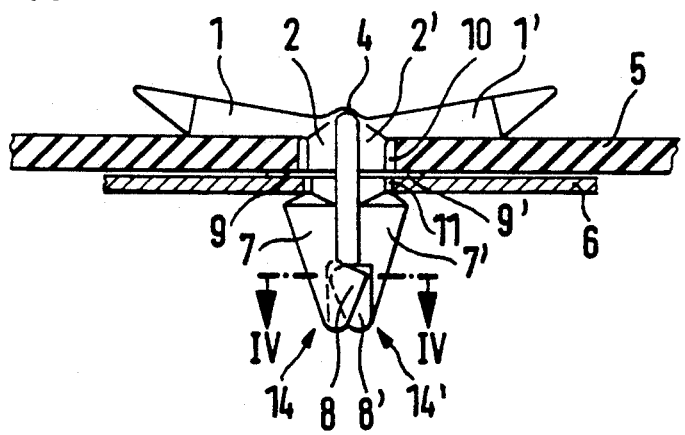
FIG. 3 shows the plastic clip in a mounted state.

The plastic clip shown in the drawings can be used for the blind fastening of soft-elastic flat bodies, such as for example rubber mats 5, on a carrier plate 6. The clip consists essentially of L-shaped parts, each part consisting of a spreading finger 1, 1' of semicircular cross-section, and a stem half 2 and 2' which stems are integrally and rigidly jointed at right angles at one end to one end of said fingers. The L-shaped parts are further pivotally joined to one another by a flexible web 4 at the bases 3', 3' of L's, which is the point where the stem halves join the spreading fingers. This is the state in which the clip is supplied.

At a distance from the inside of the L's of each part, which distance corresponds approximately to the total thickness of the plates 5 and 6 to be joined together, each of the two stem halves 2, 2' carries a laterally projecting and resiliently compressible locking protrusion 7 and 7', respectively. These protrusions have inclined bearing surfaces 13, 13' which, after introduction into a hole 11 in the carrier plate 6, bear against the edge 12 of the hole on the rear side.

Figure 4:
FIG. 4 is a sectional view through the stem halves at the level of the catch hooks taken along the line IV—IV in FIG. 3.

As can be seen in particular in FIGS. 1 and 4, at the free ends 14, 14' of the two stem halves 2, 2', there are provided oppositely directed, interengageable catch means such as cooperating locking hooks 8 and 8'. In addition, thin separating tongues 9 and 9' are formed on the stem halves 2, 2'. These tongues project approximately at right angles to the stem halves 2, 2' between the bases 3, 3' and the protrusions 7, 7', approximately at a distance from the bearing surfaces 13, 13' of the protrusions 7, 7', which distance is approximately equal to the thickness of the carrier plate 6. The tongues are bent slightly over towards protrusions 7 and 7' at their ends.

Figure 5:
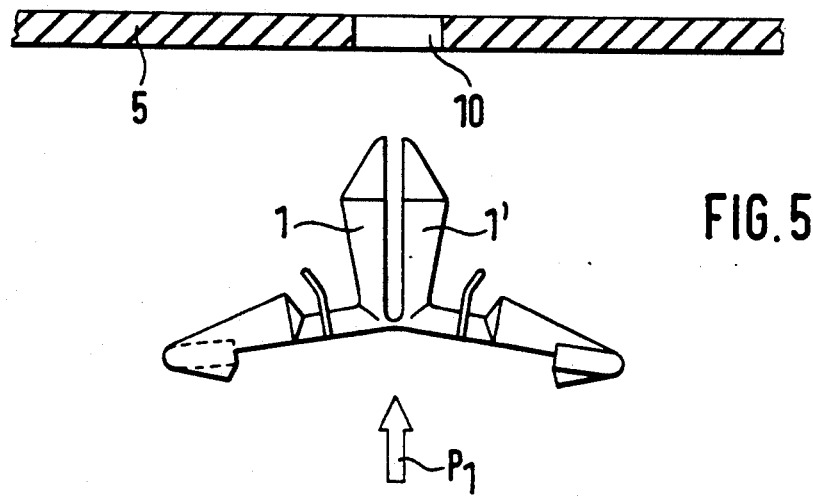
FIG. 5 shows the clip's orientation for introduction first into the fastening hole in a rubber mat.
Figure 6:
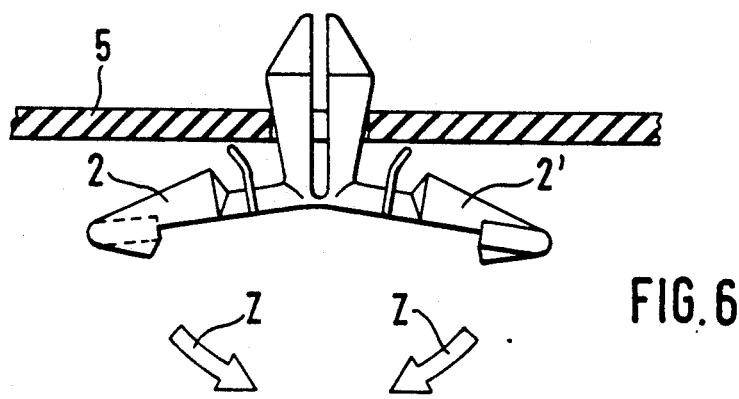
FIG. 6 shows the clip after it has been introduced into the hole and before the two stem halves are brought together.

For the purpose of fastening a rubber mat 5 on a carrier plate 6, spreading fingers 1, 1', of the two L-shaped parts lying side by side in a first position, are introduced first into fastening hole 10 in the mat in the direction of the arrow "P1", until the stem halves 2 and 2', which, in the state in which the clip is supplied, project at right angles to the fingers 1, 1', or the separating tongues 9, 9' lie against the underside of mat 5 (FIG. 5). Fingers 1, 1' are then firmly pressed into hole 10 and at the same time the laterally projecting stem halves 2, 2' are pivoted or brought together in the direction of the arrows "Z" (FIG. 6) toward a second position for the two L-shaped parts where the two halves now form a complete stem.

Figure 7:
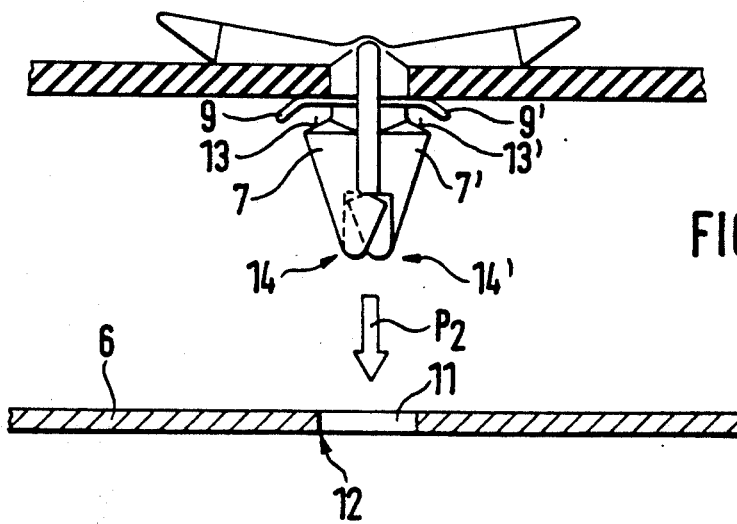
FIG. 7 shows the clip firmly fastened to the rubber mat and its orientation for introduction of the stem part into the fastening hole in the carrier plate.

As a result of this combined pushing of the fingers and pivoting of the stem halves and because of the rigid elbow joint between the fingers and the stem halves, the spreading fingers 1, 1' are at the same time pivoted apart and down against the front side of the elastically widening hole 10 in mat 5 (FIG. 7).

At the end of the pivoting movement, stem halves 2, 2' will strike one another at their ends 14, 14', so that the locking hooks 8, 8' engage in one another and the clip is thus secured in its clamped position (FIGS. 4 & 7).

Stem ends 14, 14', which are now hooked together, to form a complete stem are then pressed into hole 11 in carrier plate 6 in the direction of arrow "P2" until the protrusions 7, 7' on the stems pass through hole 11 and the bearing surfaces 13, 13' bear against the edge 12 of hole 11 from the back side. (FIGS. 4 and 7).

Separating tongues 9 and 9', projecting from the stems 2, 2' thus take up a position between rubber mat 5 and carrier plate 6, forcing them slightly apart so that the clamping action between the protrusions 7, 7' and the spreading fingers 1, 1' is further slightly increased.

When necessary, the clip can be very simply detached by first pressing protrusions 7, 7' together and pushing them back through hole 11 in plate 6. Hooks 8, 8' are then disengaged from each other and the stem halves 2, 2' bent outwards. The spreading fingers 1, 1' thus pivot back towards one another, whereby the clip can be extracted without difficulty from fastening hole 10 in mat 5.

What is claimed is:

1. A plastic clip for securing a soft-elastic flat body to a carrier plate, said flat body having a front side, a rear side and a fastening hole therein and said carrier plate having a front side and a rear side and a fastening hole therein having a rear edge, said clip comprising a pair of L-shaped parts, each part comprising a spreading finger having an inner end and an outer end, and a stem half having an inner end and an outer end, the inner end of each stem half being rigidly joined at approximately right angles to the inner end of a spreading finger to form said pair of L-shaped parts, each L-shaped part having a base where the stem half joins the spreading finger and a flexible web interconnecting said two parts together from the outside of the base of the L of each part, the two parts being pivotable with respect to one another between a first position where the two spreading fingers lie adjacent each other and can be pushed through the fastening hole in the flat body from the rear side to the front side and a second position where, after the fingers have been pushed through the hole in the flat body and have been forced apart and bear against the front side of the body, the two stem halves lie adjacent each other to form a complete stem, wherein said complete stem can now be pushed through the hole in the plate from the front side to the rear side and resilient, compressible locking protrusions on said stem halves spaced from the inside of the base of the L of each part that pass through and then bear against the rear edge of said hole in the plate.

2. The plastic clip of claim 1, including catch means on the outer ends of the stem halves that lockingly engage with one another when said halves are brought together to form said complete stem.

3. The plastic clip of claim 2, wherein said catch means comprise cooperating locking hooks that can be readily engaged and disengaged.

4. The plastic clip of claim 1, wherein thin separating tongues project approximately at right angles to the stem halves between the inside of the base of the L of each part and the locking protrusions, which tongues lie between the rear side of said flat body and the front side of said carrier plate when said clip is engaged in said body and plate.

5. The plastic clip of claim 1, wherein the distance between the inside of the base of the L of each part and the protrusions is approximately equal to the combined thickness of the flat body and carrier plate.

* * * * *